(12) United States Patent
Rival

(10) Patent No.: US 9,419,427 B2
(45) Date of Patent: Aug. 16, 2016

(54) DEVICE AND METHOD FOR PROTECTION FROM AN ELECTRIC ARC

(71) Applicant: SCHNEIDER ELECTRIC INDUSTRIES SAS, Rueil Malmaison (FR)

(72) Inventor: Marc Rival, Saint Ismier (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 120 days.

(21) Appl. No.: 14/360,200

(22) PCT Filed: Nov. 21, 2012

(86) PCT No.: PCT/FR2012/000478
§ 371 (c)(1),
(2) Date: May 22, 2014

(87) PCT Pub. No.: WO2013/076388
PCT Pub. Date: May 30, 2013

(65) Prior Publication Data
US 2015/0092304 A1    Apr. 2, 2015

(30) Foreign Application Priority Data
Nov. 22, 2011 (FR) ...................................... 11 03544

(51) Int. Cl.
*H02H 3/00* (2006.01)
*H02H 3/033* (2006.01)
*H02H 1/00* (2006.01)
(Continued)

(52) U.S. Cl.
CPC ............. *H02H 3/033* (2013.01); *H02H 1/0015* (2013.01); *H02H 3/023* (2013.01); *H02H 3/027* (2013.01); *H02H 3/083* (2013.01); *H02H 3/093* (2013.01); *H02H 3/16* (2013.01); *H02H 9/02* (2013.01)

(58) Field of Classification Search
USPC ...................................................... 361/42–50
See application file for complete search history.

(56) References Cited

U.S. PATENT DOCUMENTS 4,369,364 A    1/1983   Kuntermann
6,317,019 B1  11/2001   Herpin et al.
(Continued)

FOREIGN PATENT DOCUMENTS

| DE | 1 048 100 | 11/2000 |
|---|---|---|
| DE | 199 52 507 | 6/2001 |

(Continued)

OTHER PUBLICATIONS

International Search Report Issued Apr. 4, 2013 in PCT/FR12/000478 Filed Nov. 21, 2012.

(Continued)

*Primary Examiner* — Danny Nguyen
(74) *Attorney, Agent, or Firm* — Oblon, McClelland, Maier & Neustadt, L.L.P

(57) ABSTRACT

A device for protection against an electric arc in an electric installation comprising: at least one detection apparatus of the electric arc, at least one short-circuiter establishing a short-circuit for extinction of the electric arc, an electronic control unit of the short-circuiter commanding to an established state of said short-circuit in case of detection of the electric arc by the detection apparatus, and a switchgear apparatus for interrupting said short-circuit at the end of a predefined short-circuit time delay as from the time this short-circuit is established.

16 Claims, 2 Drawing Sheets

(51) Int. Cl.
  *H02H 3/027* (2006.01)
  *H02H 3/02* (2006.01)
  *H02H 3/08* (2006.01)
  *H02H 3/093* (2006.01)
  *H02H 9/02* (2006.01)
  *H02H 3/16* (2006.01)

(56) References Cited

U.S. PATENT DOCUMENTS

| | | | |
|---|---|---|---|
| 6,657,150 B1* | 12/2003 | Shea | H01H 3/3031 218/154 |
| 7,633,730 B2 | 12/2009 | Boeder et al. | |
| 7,929,260 B2* | 4/2011 | Roscoe | H01T 2/02 361/131 |
| 2007/0062912 A1 | 3/2007 | Rival | |
| 2008/0239592 A1 | 10/2008 | Roscoe et al. | |
| 2008/0239598 A1 | 10/2008 | Asokan et al. | |
| 2011/0299200 A1* | 12/2011 | Yanniello | H02H 1/0023 361/42 |
| 2011/0315662 A1* | 12/2011 | Byron | H01H 33/66 218/140 |

FOREIGN PATENT DOCUMENTS

| | | |
|---|---|---|
| DE | 10 2009 031 647 | 1/2011 |
| EP | 0 575 932 | 12/1993 |
| EP | 2 073 229 | 6/2009 |
| FR | 2 891 082 | 3/2007 |

OTHER PUBLICATIONS

French Search Report Issued May 25, 2012 in French Application No. 1103544 Filed Nov. 22, 2011.

\* cited by examiner

DEVICE AND METHOD FOR PROTECTION FROM AN ELECTRIC ARC

BACKGROUND OF THE INVENTION

The present invention relates to the field of protection against electric arcs, such as internal arcs, which can occur in electric installations, for example between two phases. More precisely, the invention relates to a device for protection against an electric arc in an electric installation.

The invention also relates to a method for protection against an electric arc in an electric installation.

STATE OF THE ART

An electric arc is accompanied by release of a large quantity of energy in a very short time. The released power is in particular in the form of heat and in the form of an explosion generating a shock wave in the air. Its effects, which are sometimes considerable, are both destructive for equipment and dangerous for personnel, sometimes causing very severe injuries, even when the electric arc generating the released power is an internal arc.

Electric arcs in low, medium and high voltage three-phase installations are more frequent than was previously thought. Among the injuries caused by electric arcs, in particular by their heat radiation and/or by their shock wave, the following are however to be found: third degree burns, loss of hearing, loss of vision, damage to the nervous system and/or cardiac arrest. Unfortunately, even fatal accidents subsequent to electric arcs are to be deplored.

It is further known that the detrimental effects of an electric arc are attenuated the quicker the latter is interrupted. This is why, due to the gravity these effects can have, protection against electric arcs is mainly or even exclusively targeted to obtaining high performances in terms of speed of reaction and/or to devices able to achieve these performances in establishing an arc extinguishing short-circuit. Among the documents bearing witness to the interest prompted by such devices, European Patent applications EP-1,048,100 and EP-2,073,229, and U.S. Pat. No. 7,633,730 and United States Patent application US-2008/0239598 can be cited.

At the present time, arc extinction does not take account of the specificities of this arc. It is always obtained by a short-circuit accompanied by interruption of the electric power supply, which then has to be put back into service by an operator, after a sufficiently long time to result in an operation outage leading to shut-down of the equipment affected by the power supply interruption.

The document DE 19952507 discloses a device for producing a short-circuit in order to modify the conditions for maintaining the electric arc.

The document US2008/023592 describes a current limiting device when an electric arc occurs. When an electric arc is detected, a time delay is triggered and a search for the electric arc is again performed at the end of the time delay. If the electric arc is detected at the end of the time delay, an action is performed to eliminate the electric arc.

The document DE 102009031647 describes a device for limiting the current when an electric arc occurs. The device comprises a short-circuiter configured to short-circuit the power supply lines. The short-circuiter is maintained so long as the voltage in the low-voltage system is higher than the starting voltage of an electric arc.

OBJECT OF THE INVENTION

The object of the invention is at least to improve processing of an accidental electric arc.

According to the invention, this object is achieved by means of a protection device of the above-mentioned type which comprises an apparatus for switching said short-circuit at the end of a predefined short-circuit time delay as from the time this short-circuit was established.

The protection device according to the invention can incorporate one or more other advantageous features, either alone or in combination, in particular those defined below.

Advantageously, the protection device against an electric arc comprises:
- at least one detection apparatus of the electric arc,
- at least one short-circuiter establishing a short-circuit for extinction of the electric arc, and
- an electronic control unit of the short-circuiter commanding to an established state of said short-circuit in case of detection of the electric arc by the detection apparatus,
- a switchgear apparatus for interrupting said short-circuit at the end of a predefined short-circuit time delay as from the time this short-circuit is established,
- an electric isolating circuit breaker between the electric installation and the electric power source of this electric installation, and
- an actuating system of this circuit breaker to an electric isolation state between the electric installation and the electric power source in case of detection of the electric arc by the detection apparatus after a predefined time after initial detection of the electric arc.

Advantageously, said short-circuiter is a first short-circuiter. The device for protection against an electric arc preferably comprises:
- a second short-circuiter, which is a short-circuiter at least for establishment of a second short-circuit for extinction of the electric arc,
- an electronic control unit of the second short-circuiter commanding to an established state of said second short-circuit in case of detection of the electric arc by the detection apparatus after a predefined time after initial detection of the electric arc.

Advantageously, the electronic control unit of the first short-circuiter is also the electronic control unit of the second short-circuiter.

Advantageously, the predefined time after initial detection of the electric arc is terminated after said predefined short-circuit time delay.

It is a further object of the invention to provide a protection method of the above-mentioned type which comprises a step in which:
a) said short-circuit is interrupted at the end of a predefined short-circuit time delay after the time at which this short-circuit was established.

The method according to the invention can incorporate one or more other advantageous features, either alone or in combination, in particular among those defined hereafter.

Advantageously, the method for protection against an electric arc comprises steps in which:
d) at least after a predefined time as from the time at which the electric arc was initially detected, a possible resurgence of the electric arc in the electric installation is monitored,
e) in case of detection of an electric arc after the predefined time, the electric installation is isolated from an electric power source of this electric installation.

Advantageously, said predefined short-circuit time delay is longer than 1.5 ms.

Advantageously, said predefined short-circuit time delay is shorter than 20 ms.

Advantageously, said predefined short-circuit time delay is comprised between 3 ms and 6 ms.

Advantageously said predefined short-circuit time delay is about 4 ms.

BRIEF DESCRIPTION OF THE DRAWINGS

Other advantages and features will become more clearly apparent from the following description of particular embodiments of the invention given for non-restrictive example purposes only and represented in the appended drawings, among which.

DESCRIPTION OF A PREFERRED EMBODIMENT OF THE INVENTION

Figure 1:
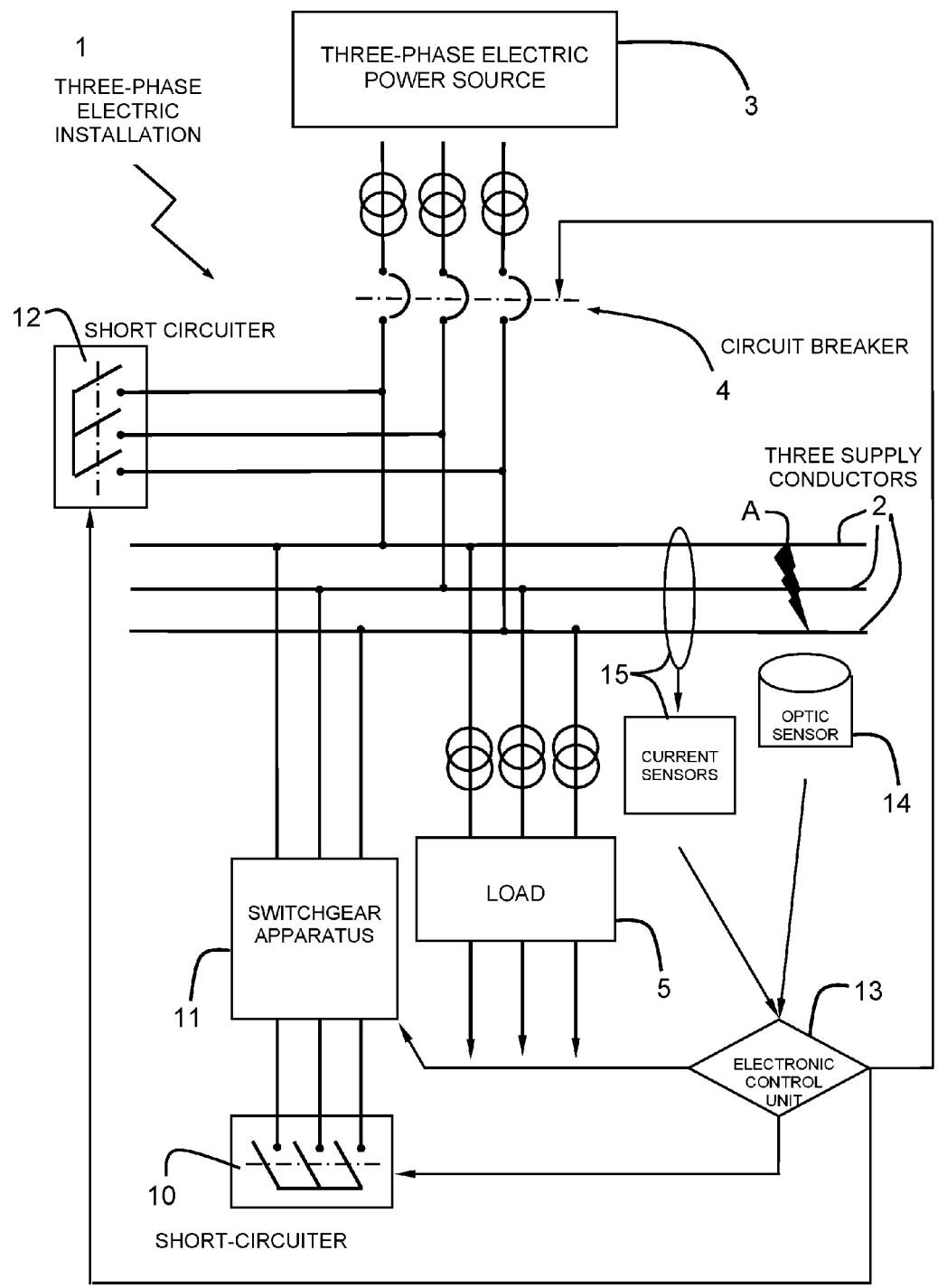
FIG. 1 is an electric wiring diagram of a three-phase installation connected to a power source and equipped with a protection device against an electric arc according to the invention.

In FIG. 1, a three-phase electric installation 1 comprises three supply conductors 2 each of which corresponds to a phase and which are connected to a three-phase electric power source 3. A circuit breaker 4 is fitted between this power source 3 and the three conductors 2 so as to be able to electrically isolate power source 3 by interrupting the electric power supply of these three conductors 2. Circuit breaker 4 can be of well-known type, i.e. an Air Circuit Breaker (known under the abbreviation ACB).

Several apparatuses or devices are connected to power supply conductors 2, for example inside a cabinet not schematically represented for the sake of clarity. Among these apparatuses one or more loads 5 are present. In the example of FIG. 1, a single load 5 is represented, again for the sake of clarity.

A short-circuiter 10 forming a part of a protection device according to the invention and designed to protect against accidental electric arcs is also connected to the three supply conductors 2 so as to be able to establish a short-circuit between these three conductors 2, i.e. between the three phases, to eliminate such an electric arc if necessary. Connection thereof is more precisely performed by means of a switchgear apparatus 11 which also forms a part of the protection device and which is fitted between supply conductors 2 on the one hand and short-circuiter 10 on the other hand.

In this way, this switchgear apparatus 11 is able to interrupt a short-circuit performed by short-circuiter 10, i.e. to re-establish the electric isolation between supply conductors 2. The circuit breaker is preferably a Molded Case Circuit Breaker (known under the abbreviation MCCB). Preferred examples of circuit breakers able to be used as switchgear apparatus 11 are described in French Patent application FR-2 891 082 and in U.S. Pat. No. 6,317,019. Devices other than a circuit breaker can perform the breaking function of apparatus 11. For example, a current limiter with a pyrotechnic actuator can constitute switchgear apparatus 11.

In the preferred embodiment of FIG. 1, short-circuiter 10 is a first short-circuiter in so far as the protection device against electric arcs comprises a second short-circuiter, which is referenced 12.

Like short-circuiter 10, short-circuiter 12 is connected so as to be able to short-circuit the three power supply lines 2. Unlike short-circuiter 10 however, it cannot be isolated from these lines 2 by switchgear apparatus 11. This short-circuiter 12 is connected down-line from circuit breaker 4 so that its action of short-circuiting the phases automatically results in tripping of this circuit breaker 4 to an isolated state of electric power source 3, i.e. disconnection of installation 1 from this source 3.

Short-circuiters 10 and 12 have to be able to establish a short-circuit in a very short time, preferably equal to 1 millisecond and at most a few milliseconds. They can be similar or identical, for example of the same type as the short-circuiter with pyrotechnical actuator proposed in European Patent EP-1,048,100. Other short-circuiters than those of this type can naturally be used, especially if their performances are even better. Even if pyrotechnical actuator short-circuiters are preferred in an embodiment of the invention, other types of short-circuiter can also be used without departing from the scope of the invention.

Short-circuiters 10 and 12 are controlled by an electronic control unit 13 that is able to perform monitoring and to conduct a succession of logic steps. This electronic control unit 13 can also control circuit breaker 4, which is the case in the embodiment of FIG. 1.

One or more complementary electric arc detection apparatuses are connected to electronic unit 13 to which they continuously or regularly supply values according to their measurements and/or their detection or lack of detection of an arc. In the example represented in FIG. 1, these detection apparatuses are two in number and are complementary for greater speed and/or reliability of detection. More precisely, they are an optic sensor 14 and a set 15 of sensors of the current in supply conductors 2.

Optic sensor 14 has the function of detecting the flash produced by an electric arc should one arise. Sensors able to detect such flashes are well-known. Examples of such sensors can be found in European Patent application EP-0 575 932 or in U.S. Pat. No. 4,369,364.

Figure 2:
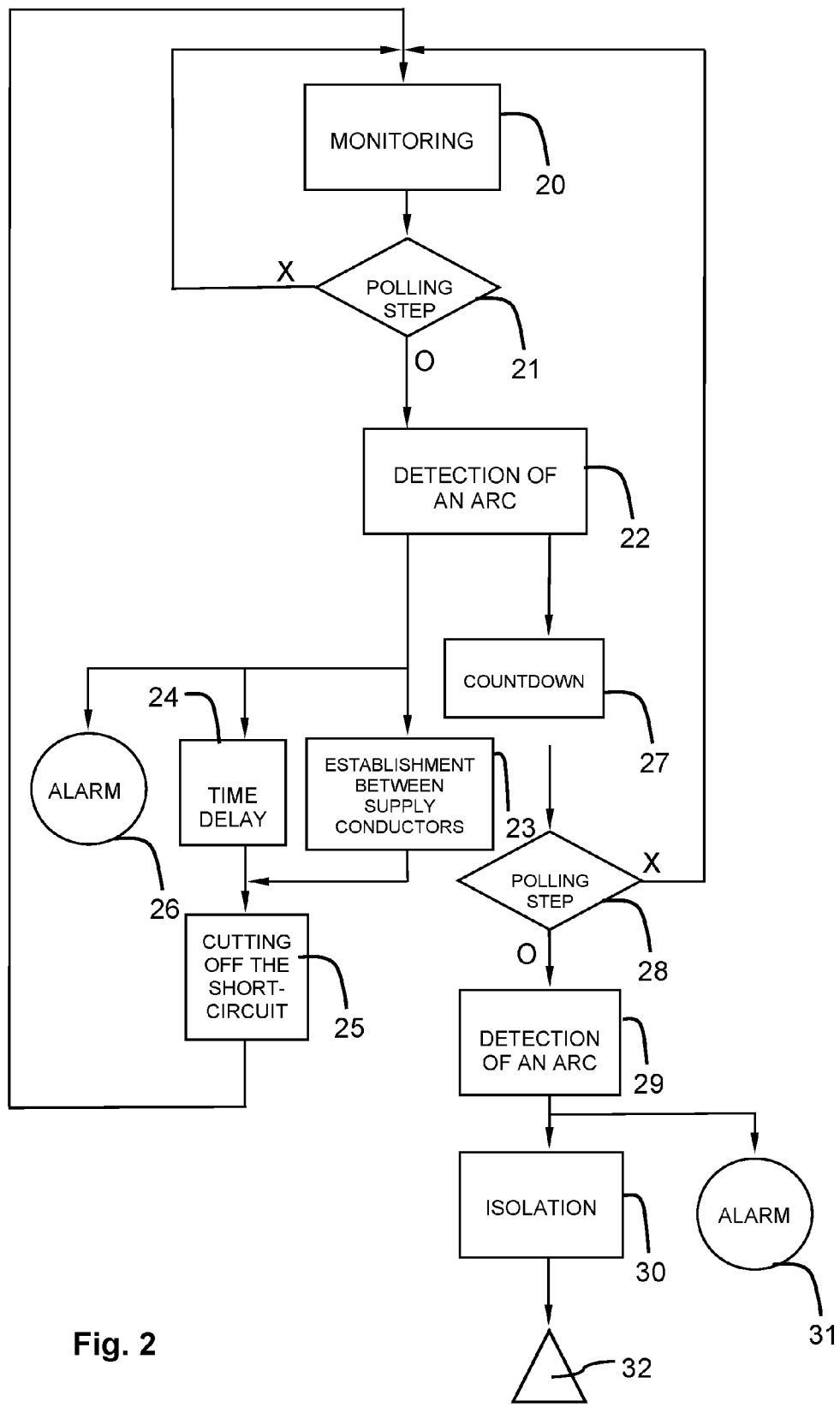
FIG. 2 is a synoptic diagram of the operating logic of the protection device of FIG. 1.

FIG. 2 illustrates an advantageous operation of the protection device of three-phase installation 1, this operation being controlled by electronic control unit 13.

As soon as three-phase installation 1 is powered on, electronic control unit 13 performs monitoring 20, continuously or regularly analysing the data it receives from optic sensor 14 and from the set of current sensors 15. The object of this monitoring 20 is to detect a possible electric arc in three-phase installation 1.

In a polling step 21, electronic control unit 13 uses its analysis of the data from detection apparatuses 14 and 15 to determine the occurrence or not of an electric arc, i.e. to answer the question of knowing whether an electric arc occurs. If it answers this question by the negative X, electronic control unit 13 continues its monitoring normally.

FIG. 1 illustrates the case of an occurrence of an accidental electric arc, which is designated by the reference A. In such a case, as schematized in FIG. 2, electronic control unit 13 answers the question it asks in polling step 21 by the affirmative O. In other words, it decides whether detection 22 of an arc has taken place, which makes it trigger several actions.

One of these actions is sending of an order addressed to short-circuiter 10 ordering establishment 23 of a short-circuit for extinction of electric arc A. On receipt of this order, short-circuiter 10 switches from an open state to a closed state in which the three supply conductors 2 are electrically connected to one another and advantageously also grounded. The resulting short-circuit reduces or even cancels the potential differences between supply conductors 2, which leads to extinction of electric arc A.

This electric arc A can have a fleeting cause. After this cause has disappeared, electric arc A generally if not always continues to exist in the absence of instauration of a short-circuit, as it locally ionises the air so as to generate a conductive path between conductors 2 where it occurs. Once this conductive path has been created, electric arc A takes it and continues to take it even after its initial cause has disappeared.

Consequently, even in the case where the cause of electric arc A is fleeting, a short-circuit between supply conductors 2 is generally if not always necessary for this electric arc A to disappear. If it was maintained for a long time, for example until human intervention takes place, this short-circuit would lead to load 5 being systematically disconnected from power source 3 and therefore from its electric power supply, which may be futile and therefore detrimental in the case of a fleeting cause for electric arc A.

That is why another action following detection 22 of arc A is triggering of a time delay 24 which is counted down by electronic control unit 13 and during which the short-circuit between supply conductors 2 is maintained. This time delay is chosen taking account of two requirements. The first requirement is that the short-circuit has to be maintained long enough to enable sufficient regeneration of the air at the level of the above-mentioned conductive path and so that the conductivity of the air is sufficiently attenuated therein. The second requirement is to reduce as far as possible the period during which load 5 is not correctly supplied.

The predefined short-circuit time delay 24 is advantageously more than 1.5 ms, advantageously less than 20 ms, preferably comprised between 3 ms and 6 ms, and in substantially optimal manner is about 4 ms.

As a variant, time delay 24 can be counted down by switchgear device 11 and not by electronic control unit 13. Although it still exists in this case, this time delay 24 no longer forms part of the steps that electronic control unit 13 controls during the operating logic steps represented in FIG. 2.

When the predefined short-circuit time delay has been completely counted down, electronic control unit 13 sends a new order which is to cut off, i.e. to interrupt, the short-circuit for extinction of arc A, in a step 25. This new order is sent to switchgear apparatus 11, which it orders to trip to switch from closed or on state to an open disconnection state of short-circuiter 10.

In the case of the variant where time delay 24 is counted down by switchgear apparatus 11, interruption of the short-circuit for extinction of arc A results from a process internal to this switchgear apparatus 11, without an interruption order from electronic control unit 13. In this case, in order to be able to operate in autonomous manner from establishment 23 of the short-circuit for extinction of arc A, switchgear device 11 can comprise a trip unit commanding opening of the latter on expiry of time delay 24.

After breaking of the short-circuit in step 25, electric arc A has disappeared without being able to re-establish itself on its own as its cause was fleeting and has disappeared in the meantime. In this case, electric power supply of load 5 returns to normal and there is no discontinuity of service, this load 5 having continued to operate without having to be restarted once arc A was extinguished. This is particularly advantageous in data centers where interruptions of operation are very detrimental in particular being able to lead to data losses that are sometimes irreversible.

Once the electric power supply of load 5 has been re-established, short-circuiter 10 and switchgear apparatus 11 have to be reset to their initial state in order to be able to be operational again in case of a new electric arc. An alarm 26 enables an operator to know that this has to be done. Electronic control unit 13 triggers this alarm as one of the actions following detection 22 of electric arc A.

Yet another action performed by electronic control unit 13 follows this detection 22. This is countdown 27 of a predefined period as from initial detection 22 of electric arc A. This predefined period is chosen such as to perform sorting between electric arcs having a fleeting cause and other electric arcs which have to be processed otherwise. Electronic control unit 13 performs a polling step 28 at the end of the predefined period, which reaches its end after the predefined short-circuit time delay. This step 28 is identical to polling step 21 dealt with in the foregoing.

If it answers the question of knowing whether an electric arc is still produced by the negative X, electronic control unit 13 reverts to its normal monitoring 20 at the end of polling step 28.

The opposite case is that where electronic control unit 13 considers that polling step 28 concludes in detection 29 of an electric arc. In this case, it is considered that this arc is a resurgence of previously detected electric arc A and that the cause of the latter is not to be considered as being fleeting. This leads to triggering of several actions which are commanded by electronic control unit 13, one of which, referenced 30 in FIG. 2, is to disconnect three-phase installation 1 from electric power source 3.

In the example represented, isolation 30 between electric power source 3 and three-phase installation 1 results from at least one of two orders sent simultaneously by electronic control unit 13. One of these two orders is sent to circuit breaker 4 and orders it to trip, i.e. to switch from closed or on state to an open disconnection state of three-phase installation 1.

The other order sent by electronic control unit 13 following detection 29 of an arc is sent to short-circuiter 12 and commands establishment 23 by the latter of a new short-circuit between supply conductors 2. Being permanent until a human intervention is performed restoring normal operating conditions, this new short-circuit eliminates the resurgent arc and then prevents a reoccurrence of the latter. As it is lasting, it also causes automatic tripping of circuit breaker 4.

As a variant, electronic control unit 13 may therefore only send one order, the one sent to short-circuiter 12. It may also only send the order to circuit breaker 4.

Disconnection of three-phase installation 1 leads to shutdown of the latter, i.e. to the end of its operation, which is symbolised by triangle 32 in FIG. 2.

When circuit breaker 4 has tripped, a diagnosis of three-phase installation 1 has to be performed before the latter is put back into operation. An alarm 31 enables an operator to know that this diagnosis has to be performed and that installation 1 has to be put back into operation. Electronic control unit 13 triggers this alarm 31 as one of the consequences following arc detection 29.

It is apparent from the foregoing that operation of the device for protection against electric arcs in three-phase installation 1 is selective in that it treats arcs having a fleeting cause differently from those subsequent to a lasting fault, such as an anomaly requiring human intervention to be eliminated. Arcs having a fleeting cause are eliminated without interruption of service, i.e. in a manner which enables continuity of operation of load 5.

An example of a fleeting cause of an electric arc is that, during its fall, a falling conducting object simultaneously touches two of the supply conductors 2 without being immobilised thereon.

The invention is not limited to the previously described embodiment. In particular the order transmission means of electronic control unit 13 to circuit breaker 4 can be eliminated without departing from the scope of the invention. In another configuration, short-circuiter 12 can also be eliminated, again without departing from the scope of the invention.

The invention claimed is:

1. A protection device against an electric arc in an electric installation, comprising:
    at least one detector configured to detect said electric arc,
    a first short-circuiter configured to establish a first short-circuit for extinction of said electric arc when the at least one detector performs an initial detection of said electric arc,
    a switchgear apparatus configured to interrupt said first short-circuit at the end of a first time delay running from establishment of said first short-circuit by the first short-circuiter,
    a circuit breaker configured to electrically isolate said electric installation from an electric power source of said electric installation when the at least one detector detects said electric arc after a second time delay running from initial detection of said electric arc, the second time delay being longer than the first time delay.

2. The protection device according to claim 1, comprising:
    a second short-circuiter configured to at least establish a second short-circuit for extinction of the electric arc when the at least one detector detects the electric arc after a predefined time running from initial detection of the electric arc.

3. The protection device according to claim 2, wherein the second short-circuiter is connected down-line from circuit breaker.

4. The protection device according to claim 2, wherein the first and second short-circuiters have a same electronic control circuit configured to command first and second short-circuits.

5. The protection device according to claim 1, wherein the second time delay comes to an end after said first time delay.

6. The protection device according to claim 1, wherein said first time delay is longer than 1.5 ms.

7. The protection device according to claim 2, wherein said first time delay is shorter than 20 ms.

8. The protection device according to claim 5, wherein said first time delay is comprised between 3 ms and 6 ms.

9. The protection device according to claim 7, wherein said first time delay is about 4 ms.

10. A protection method against an electric arc in an electric installation, comprising:
    detecting, using a detector, the electric arc,
    establishing a first short-circuit for extinction of the electric arc,
    starting counting down a first time delay from the moment the first short-circuit was established, and
    interrupting said short-circuit at the end of the first time delay.

11. The protection method according to claim 10, further comprising:
    monitoring a possible resurgence of the electric arc in the electric installation at least after a second time delay as from a time at which the electric arc was initially detected,
    isolating the electric installation from an electric power source of said electric installation when an electric arc is detected after the second time delay.

12. The protection method according to claim 10, wherein said first time delay is longer than 1.5 ms.

13. The protection method according to claim 10, wherein said first time delay is shorter than 20 ms.

14. The protection method according to claim 12, wherein said first time delay is comprised between 3 ms and 6 ms.

15. The protection method according to claim 14, wherein said first time delay is about 4 ms.

16. The protection device according to claim 1, wherein the detector is a sensor.

* * * * *